Nov. 20, 1923. 1,474,742
W. TURNBULL
STEERING AND TRANSMISSION MECHANISM
Filed Jan. 4, 1922 4 Sheets-Sheet 4
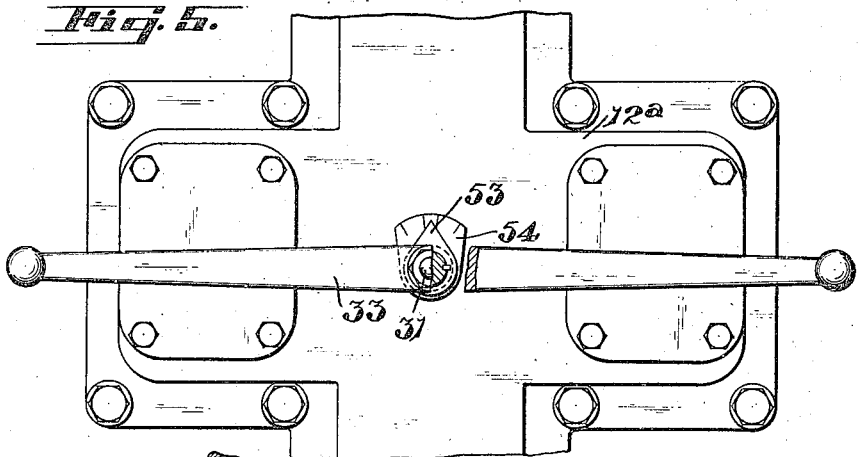
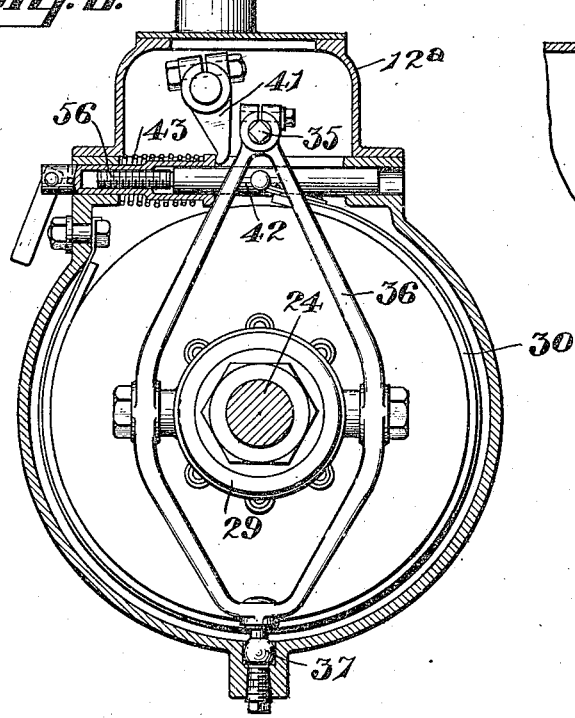
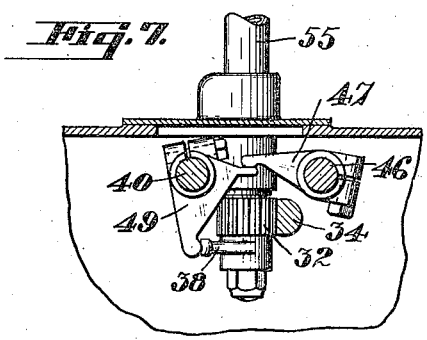
INVENTOR.
WILLIAM TURNBULL.
BY Chas. E. Townsend
ATTORNEY.

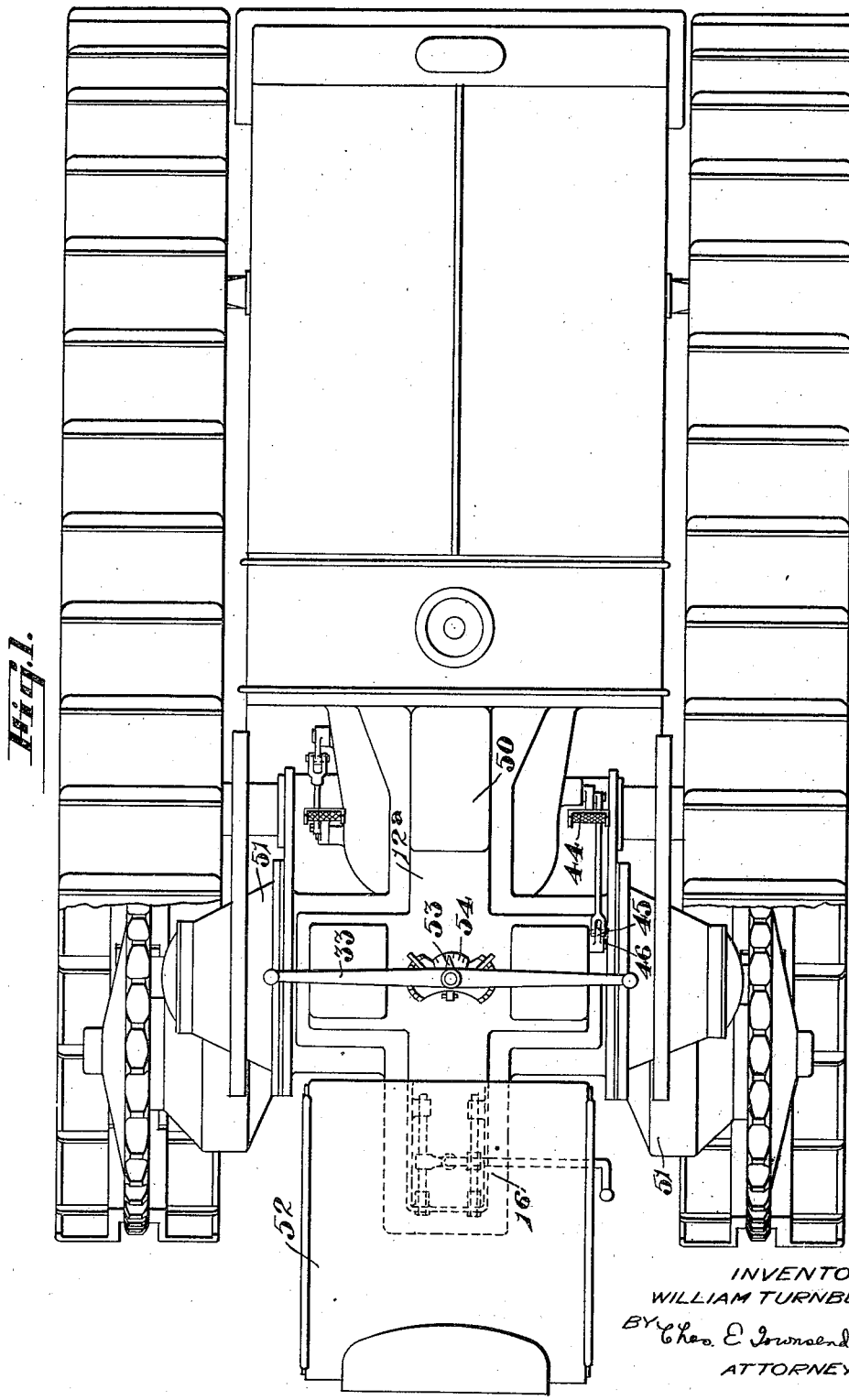

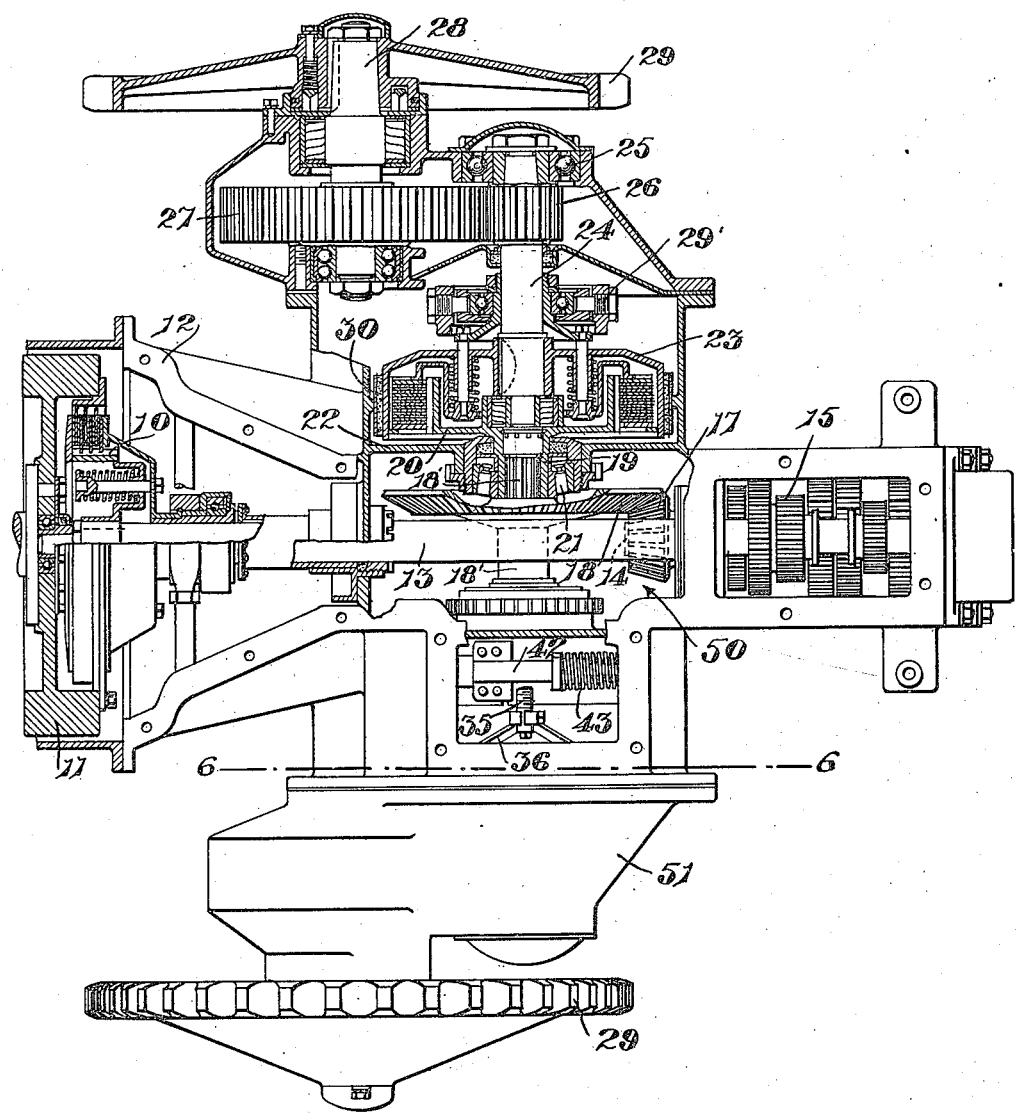

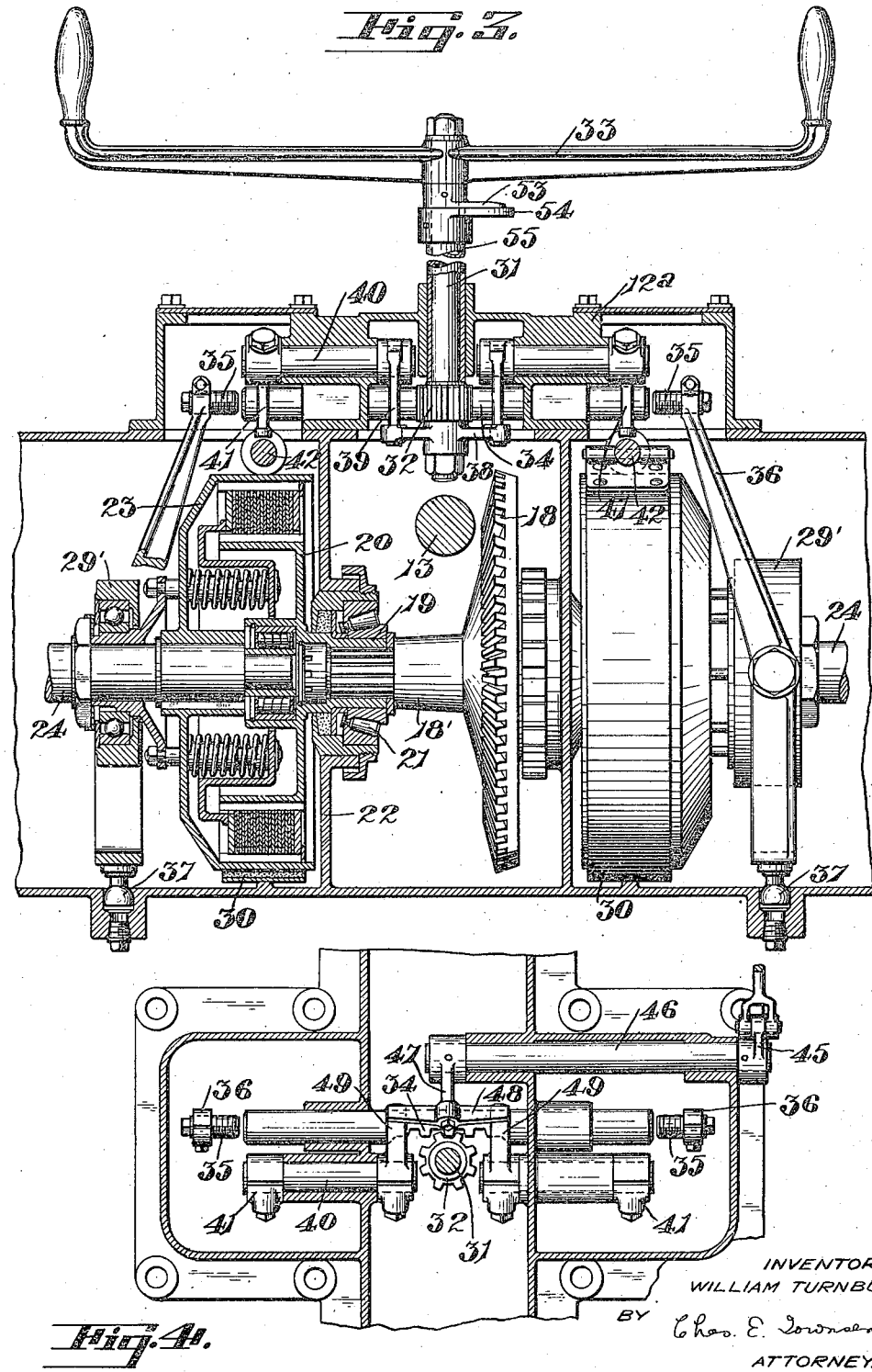

Patented Nov. 20, 1923.

1,474,742

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

STEERING AND TRANSMISSION MECHANISM.

Application filed January 4, 1922. Serial No. 526,963.

*To all whom it may concern:*

Be it known that I, WILLIAM TURNBULL, a citizen of the United States, residing at Peoria, in the county of Peoria and State of Illinois, have invented new and useful Improvements in Steering and Transmission Mechanism, of which the following is a specification.

This invention relates to transmission and steering mechanism for tractors. The object is to simplify and improve the construction and operation of a transmission mechanism wherein steering is effected by varying the speed of the traction devices. The machine as here shown was primarily designed for tractors of the self-laying track type, but obviously it can be used in connection with round wheel vehicles. It makes use of friction steering clutches and brake bands, and one purpose of the present invention is to provide a control mechanism such that when the steering post or lever which disengages the clutches is given a further movement it will cause the desired brake mechanism to be applied. A single post or lever is used for controlling both clutches and brakes and is so connected that the clutches may be disengaged separately but not simultaneously, and the brakes may be set separately but not simultaneously. Separate means are provided for simultaneously applying both brakes. The transmission and steering mechanism is contained in a small housing which is so constructed and arranged as to serve as one end of the tractor frame. A master clutch, which connects with the motor, is arranged at the front end of the housing, and at the rear end of the housing are change speed gears driving forwardly to a centrally arranged bevel gear on a transverse shaft which carries the steering clutches and transmits the power to the driving wheels.

One form which my invention may assume is exemplified in the following description and illustrated in the accompanying drawings, in which—

Fig. 1 shows a plan view of a tractor embodying my invention.

Fig. 2 shows a plan view, partly in section, of the transmission and steering mechanism.

Fig. 3 shows a vertical central sectional view through the transmission mechanism.

Fig. 4 shows a plan view of the control mechanism in section.

Fig. 5 shows a plan view of the steering arms.

Fig. 6 shows a sectional view taken on the line 6—6 of Fig. 2.

Fig. 7 shows a detail view of a portion of the connections for operating both brakes simultaneously.

Referring in detail to the accompanying drawings, a master clutch 10 is arranged at the front part of the transmission structure, being partially contained within a fly wheel 11 and partially contained within a housing 12. This clutch forms a connection between the engine and a propeller shaft 13. The propeller shaft extends rearwardly and centrally of the housing 12 and beneath said propeller shaft and parallel therewith is a countershaft 14. At the rear of the housing and connecting the propeller shaft to the countershaft are change-speed gears 15 controlled by suitable shifting mechanism 16. The countershaft 14 has at its forward end a bevel pinion 17 meshing with a bevel gear 18 arranged centrally of the housing on a transverse axis. This bevel gear has a spindle 18' at either side fitting within a hub 19 formed on one member 20 of a friction steering clutch. This clutch is preferably of the multiple-disk type and has its hub journaled in a roller bearing 21 carried upon a partition wall 22 formed within the housing. The driving member 23 of the steering clutch has a shaft 24 extending into the end wall of the housing and journaled in bearings 25. At the outer end of the shaft 24 is a pinion 26 meshing with a spur gear 27 fixed upon the axle 28 of a driving sprocket wheel 29, which latter is arranged on the exterior of the housing. A shifting ring 29' is arranged upon the shaft 24 to control the steering clutch. On the periphery of the driving clutch member 20 is arranged a brake band 30 to assist in steering. The mechanism above described is duplicated on the opposite side of the transmission structure.

A unitary control is provided for the clutches and brakes at both sides and this comprises preferably a post 31 supported in a cover 12ª of the housing, and carrying at its lower end a pinion 32 and at its upper end a wheel or handle bars 33. The pinion 32 meshes with a toothed rack 34, which rack is slidably mounted in the cover plate of the housing. At each end of the rack abuts against a block 35 adjustably seated in a yoke 36, which latter is connected to the shifting ring 29 of the adjacent steering clutch. The yoke has a ball and socket connection 37 at its lower end.

Obviously, when the rack 34 is moved in one direction it will throw out one of the clutches and when moved in the opposite direction it will throw out the other clutch.

On the lower end of the post 31 is a cross arm 38 which co-operates at each end with a crank arm 39 fixed on a rock shaft 40 mounted in the cover plate 12ª at one side of the steering post. The outer end of the rock shaft 40 has a crank arm 41 to engage a flange on a rod 42, as shown in Fig. 6. This rod is slidably mounted above the brake band and is connected at one end to said band. The rod is held retracted by a spring 43 so that the brake is normally released. When, however, the rod is thrust against the spring by the action of the crank arm 41, the brake is set. The position of the crank arms is such with relation to the cross arm 38 on the steering post that a brake does not become engaged until shortly after the corresponding clutch is released. The connections being loose ones, one brake will not be affected when the other is set.

Both brakes can be set simultaneously by means of a pedal 44 which connects with an arm 45 on a rock shaft 46 carried in the cover plate of the housing. This rock shaft carries at its inner end a crank 47 fitted with a cross arm 48. The cross arm co-operates at its ends with crank arms 49 fitted on the inner ends of the rock shafts 40. The crank arms 49 are angularly disposed with respect to the crank arms 39, and, being in line therewith, may be made integral therewith, as shown in Fig. 7. When the pedal 44 is depressed the cross arm 48 acts simultaneously on both arms 49 to set both brakes. The above described connections, being loose, will not be affected when the steering post 31 is operated to apply the brakes independently.

The foregoing mechanism is entirely housed, the housing being such as to constitute the rear of the tractor frame. It is shown as being made in three parts, namely, a central longitudinal section 50 which encloses at its forward end a portion of the master clutch, the bevel gearing and the steering clutches at the middle and the change-speed gearing 15 at the rear. The side section 51 is bolted to the central section and encloses the final drive gears. The cover plate 12ª fits over the central section only. An operator's seat 52 is mounted upon the rear end of the central section, from which position the operator has easy access to the various controls. Such a housing affords a complete closure for the transmission gearing and clutches, and at the same time permits easy access to all parts contained within. It will be noted that the cover plate supports and carries the steering post, the reciprocating rack and the various rock shafts with their connected crank arms. All of these parts may be removed with the cover plate.

Preferably the post 31 is provided with a pointer 53 co-operating with a segmental plate 54, the latter fixed upon the casing 55 of the post. This plate can be marked off to show the preferred position of the steering arms where the clutches should become disengaged and the brakes set. Should this position vary any, due to wear, etc., the operator can easily reset the clutches through the adjustable blocks 35 and the brake mechanism through the slidable rod 43. For this purpose the rod 43 has a screw-threaded adjustment at 56.

Various changes in the construction and arrangement of the several parts herein shown and described may be employed without departing from the spirit of my invention as disclosed in the appended claims.

Having thus described my invention, what I claim and desire to secure by Letters Patent is:

1. In a vehicle having friction steering clutches, control means for both clutches comprising a steering post, a reciprocating rack operatively connected thereto, a shifting member for each clutch having its free end disposed in the path of said rack, whereby the clutches may be disengaged independently but not simultaneously.

2. In a vehicle having friction steering clutches, control means for both clutches comprising a steering post, a reciprocating rack operatively connected thereto, a shifting member for each clutch having its free end disposed in the path of said rack, whereby the clutches may be disengaged independently but not simultaneously, and an adjustable part on the free end of each shifting member to contact with the adjacent end of the reciprocating rack.

3. In a vehicle having friction steering clutches and a brake for each clutch to assist in steering, control means for both brakes comprising a steering post, a cross arm fixed thereon, a rock shaft at each side of the post having its outer end operatively connected to the adjacent brake, and a crank arm on the inner end of each rock shaft disposed in the path of the cross arm whereby the brakes may be set independently, but not simultaneously.

4. In a vehicle having friction steering clutches and a brake for each clutch to assist in steering, control means for both clutches and brakes comprising a steering post, a reciprocating rack operatively connected thereto, a shift member for each clutch having its free end disposed in the path of the rack, a rock shaft at each side of the post, each having its outer end operatively connected with the adjacent brake, a cross arm on the post and a crank arm on the inner end of each rock shaft disposed in the path of the cross arm for independent, but not simultaneous, actuation.

5. In a vehicle having friction steering clutches and a brake for each clutch to assist in steering, means for controlling the brakes comprising a rock shaft for each brake, a crank arm on one end thereof, a spring-pressed slidable rod operatively connected with each brake and having a part lying in the path of the adjacent crank arm, unitary means for separately actuating said rock shafts to apply the brakes independently, and unitary means for simultaneously actuating said rock shafts to apply both brakes at once.

6. In a vehicle having friction steering clutches and a brake for each clutch to assist in steering, means for controlling the brakes comprising a rock shaft for each brake, a crank arm on one end thereof, a spring-pressed slidable rod operatively connected with each brake and having a part lying in the path of the adjacent crank arm, a crank arm on the opposite end of each rock shaft and a rockable member having a part disposed in the path of each of the last-named crank arms to separately actuate the rock shafts.

7. In a vehicle having friction clutches for steering purposes, a housing to enclose the same, a steering post extending up through the top of the housing, a pinion on the end of the post within the housing, a toothed rack in mesh with said pinion slidably mounted in the housing, and operative connections between each end of the rack and the adjacent clutch for separately, but not simultaneously, releasing said clutches.

8. In a vehicle having friction clutches for steering purposes and a brake for each clutch to assist in steering, a housing to enclose said brakes and clutches, a turnable shaft extending up through the top of the housing, a cross arm on said shaft located within the housing, and operative connections between the cross arm and each brake for separately, but not simultaneously, setting the brakes, a rod slidably mounted in the housing for disengaging the clutches separately and operative connections between the said slidable rod and the steering post.

9. In a vehicle having friction clutches for steering purposes and a brake for each clutch to assist in steering, a housing to enclose said brakes and clutches, a steering post extending up through the top of the housing, a pinion on the end of the post within the housing, a toothed rack in mesh with said pinion slidably mounted in the housing, operative connections between each end of the rack and the adjacent clutch mechanism for separately, but not simultaneously, releasing said clutches, a cross arm on the end of the post within the housing and operative connections between the cross arm and each brake for separately, but not simultaneously, setting said brakes.

10. In a vehicle having friction clutches for steering purposes and a brake for each clutch to assist in steering, a rock shaft operatively connected to each brake, a crank arm on each rock shaft, a cross arm disposed in the path of said crank arms, a turnable post for rocking said cross arm to separately actuate the rock shafts, a third rock shaft, a lever for actuating the same, and a swinging member carried upon the last-named rock shaft to engage said crank arms whereby to simultaneously actuate the same.

WILLIAM TURNBULL.